United States Patent
Lin

(10) Patent No.: US 6,628,200 B1
(45) Date of Patent: Sep. 30, 2003

(54) MOVABLE ANTI-THEFT DEVICE FOR MOBILE TELEPHONES

(76) Inventor: Chi-Hung Lin, P.O. Box 90, Tainan City, Taiwan (CN)

( * ) Notice: Subject to any disclaimer, the term of this patent is extended or adjusted under 35 U.S.C. 154(b) by 0 days.

(21) Appl. No.: 10/241,689

(22) Filed: Sep. 12, 2002

(51) Int. Cl.[7] ............................................. G08B 13/14
(52) U.S. Cl. .................... 340/568.1; 340/426; 340/540; 340/541; 340/539.16; 455/425; 455/67.1
(58) Field of Search .............................. 340/568.1, 426, 340/540, 541, 539.16; 455/425, 67.1

(56) References Cited

U.S. PATENT DOCUMENTS

| | | | | |
|---|---|---|---|---|
| 5,497,149 A | * | 3/1996 | Fast | ............................ 340/426 |
| 6,438,393 B1 | * | 8/2002 | Suuronen | ..................... 340/539 |
| 6,552,654 B1 | * | 4/2003 | Gharb | ......................... 340/426 |

* cited by examiner

Primary Examiner—Daniel J. Wu
Assistant Examiner—Hung Nguyen

(57) ABSTRACT

A movable anti-theft device for mobile telephones includes an induction system, an automatic dial system, a mobile telephone transmitting-and-receiving system, an alarm, an automatic charge system and a power delay connection system. The induction system senses unusual signals and sends them to the automatic dial system and the alarm system. The automatic dial system is able to automatically dial a preset telephone number to notify a related person. The mobile telephone transmitting-and-receiving system is able to transmit or receive signals. The alarm system is able to light up a warning light and give out sound. The automatic charge system is able to make up a self-supplying power through voltage drop and electricity storage. The power delay connection system is able to delay for a period of time and then convey power to all the foresaid systems.

2 Claims, 5 Drawing Sheets

MOVABLE ANTI-THEFT DEVICE FOR MOBILE TELEPHONES

BACKGROUND OF THE INVENTION

1. Field of the Invention

This invention relates to a movable anti-theft device for mobile telephones, particularly to one provided with an induction system, an automatic dial system, a mobile telephone transmitting-and-receiving system, an alarm system, an automatic charge system and a power delay connection system, able to transmit and receive signals without distance restriction and channel interference, convenient in use and having good practicability and safety.

2. Description of the Prior Art

A conventional anti-theft system is classified into an alarm anti-theft system, a radio-transmission anti-theft system, a photography anti-theft system and an infrared ray induction anti-theft system. The alarm anti-theft system is able to give out warning sounds to frighten a burglar when stealing happens, but such warning sounds may become useless in case an owner is not nearby. The radio-transmission anti-theft system is able to transmit signals to a user should stealing happen, but it is limited in transmittable distance and may be interfered by other signals. The photography anti-theft system is able to take photographs of a burglar when he is stealing something, but it has hardly any effect of guarding against stealing if it is not yet prepared for taking photographs and the owner is too busy to keep it under surveillance all the time. The infrared ray induction anti-theft system is able to sense unusual signals and notify a user in case of occurrence of stealing, but it has not good effect because it is installed at a stationary location. Therefore, all the above-mentioned anti-theft systems are not convenient or effective in use, and have no good practicability and security.

SUMMARY OF THE INVENTION

The objective of the invention is to offer a movable anti-theft device for mobile telephones able to transmit and receive signals without distance restriction and channel interference, simple and convenient in use, and having good practicability and security.

The feature of the invention is an induction system provided on an expansion plate and consisting of a temperature sensor, a micro-switch, a mercury switch and an infrared ray human body sensor. The expansion plate has a portion reserved for additionally installing other sensors. Further, an automatic dial system is provided with a shift circuit, an analog switch and bus terminals connected with one another. The shift circuit is able to automatically start the analog switch in sequence after receiving signals coming from the induction system. The analog switch orderly completes connection and sends out relatively connected signals to the bus terminals. The wires of the bus terminals send out the relatively connected signals and complete manually dialing the keys of a mobile telephone in sequence to reach a purpose of automatically dialing. A mobile telephone transmitting-and-receiving system is composed of a reception circuit and a transmission circuit coupled with each other, the reception circuit having a receiving terminal for receiving signals and the transmission circuit having a transmitting terminal for transmitting signals. An alarm system consists of a delay circuit, an alarm drive circuit, an alarm and a manual switch connected with one another. The operation of the alarm system is divided into automatically switching and manually switching. By automatically switching, the alarm system starts, and delayed for a period of time by the delay circuit and sends out signals to actuate the alarm drive circuit to start the alarm. By manually switching, the alarm system starts, and the manual switch is started manually to send out signals to actuate the alarm drive circuit to start the alarm. An automatic charge system consists of a voltage drop circuit and a battery connected with each other. The voltage drop circuit reduces the voltage and charges the battery after supplied with AC or DC power so as to let the battery maintain adequate power. A power delay connection system is provided with a delay circuit and a relay supply circuit coupled with each other. The delay circuit is first started manually, delayed for a period of time and sends out signals to the relay supply circuit to finish supply of power.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
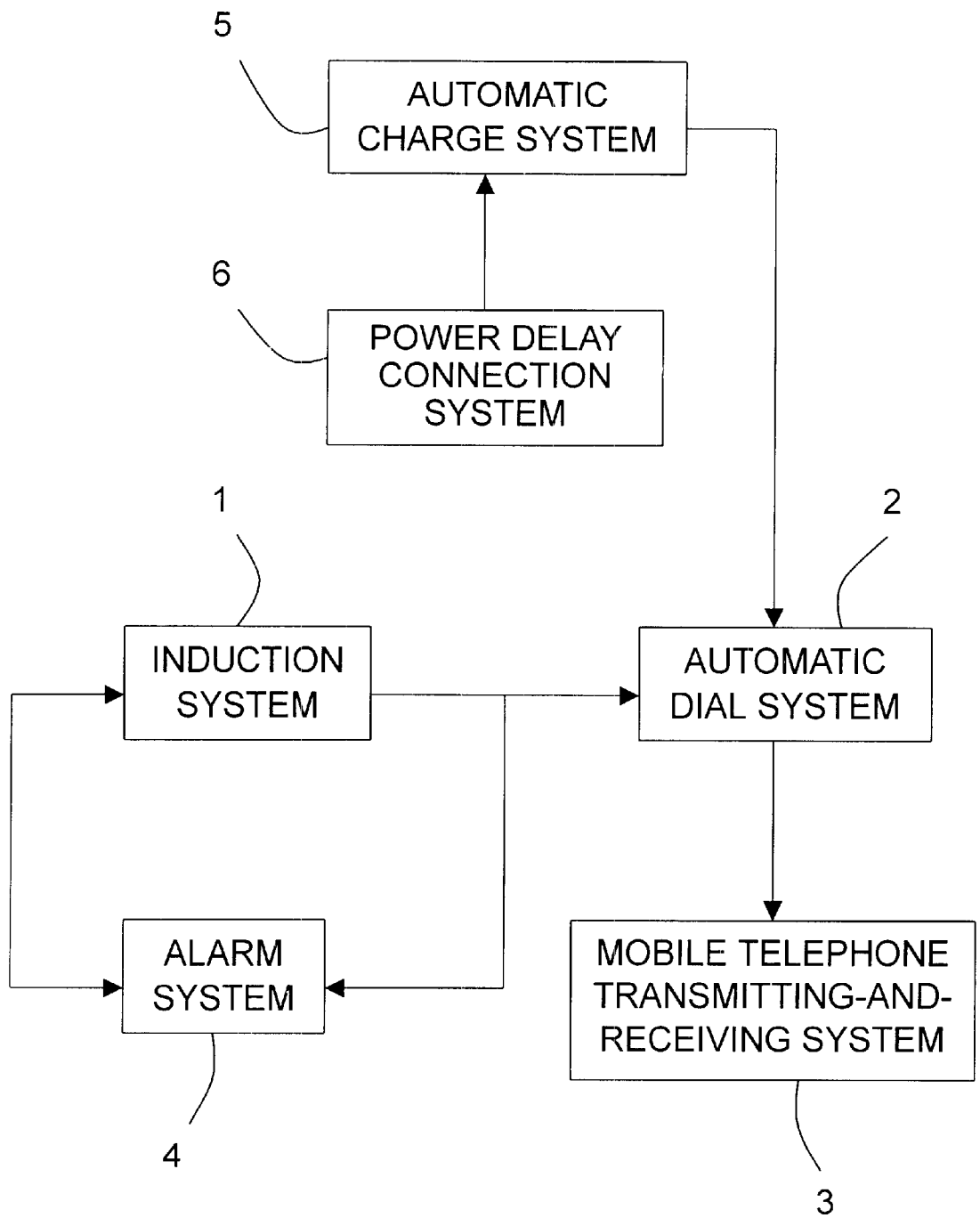
FIG. 1 is a block diagram of the systems of a movable anti-theft device for mobile telephones in the present invention.

A preferred embodiment of a movable anti-theft device for mobile telephones in the present invention, as shown in FIG. 1, includes an induction system 1, an automatic dial system 2, a mobile telephone transmitting-and-receiving system 3, an alarm system 4, an automatic charge system 5 and a power delay connection system 6 combined together.

The induction system 1 is connected with the automatic dial system 2 and the alarm system 4, able to sense unusual signals and send them to the automatic dial system 2 and the alarm system 4.

The automatic dial system 2 is connected with the induction system 1 and the mobile telephone transmitting-and-receiving system 3 as well as with the automatic charge system 5, able to dial automatically a preset telephone number to a related person.

The mobile telephone transmitting-and-receiving system 3 is connected with the automatic dial system 2, able to transmit and receive signals.

The alarm system 4 is connected with the induction system 1 and the automatic dial system 2, able to give out warning light and warning sound at the same time to frighten a burglar.

The automatic charge system 5 is connected with the automatic dial system 2 and the power delay connection system 6, able to make up a self-supplying power through voltage drop and electricity storage.

The power delay connection system 6 is connected with the automatic charge system 5, able to convey power to all the above-mentioned systems after a delay of a period of time.

Figure 2:
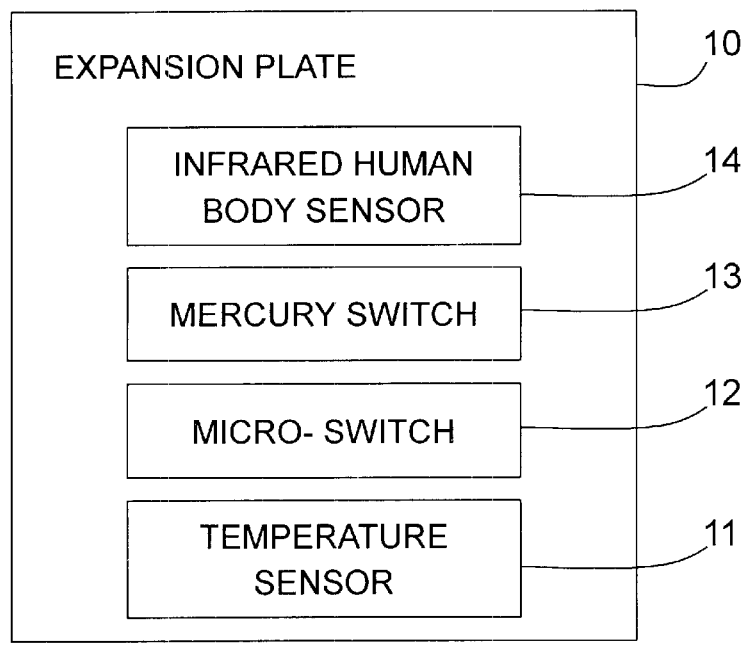
FIG. 2 is a block diagram of an induction system in the present invention.

The induction system 1, as shown in FIG. 2, is provided on an expansion plate 10, consisting of a temperature sensor 11, a micro-switch 12, a mercury switch 13 and an infrared ray human body sensor 14. The expansion plate 10 has a portion reserved for additionally installing other sensors thereon. The induction system 1 is able to sense unusual signals and send them to the automatic dial system 2 and the alarm system 4.

Figure 3:
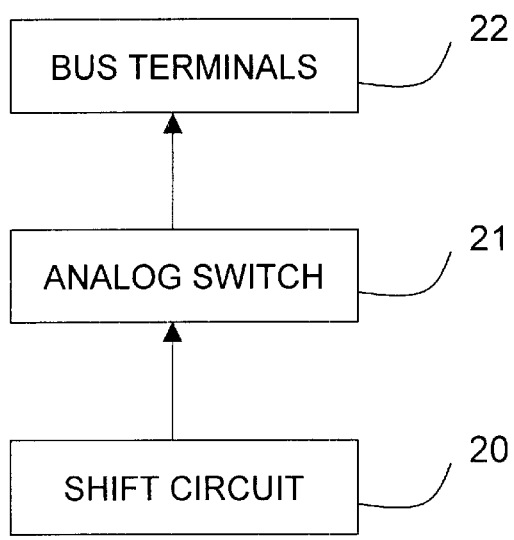
FIG. 3 is a block diagram of an automatic dial system in the present invention.

The automatic dial system 2, as shown in FIG. 3, is composed of a shift circuit 20, an analog switch 21 and bus terminals 22 connected with one another. The shift circuit 20 is able to start the analog switch 21 in sequence automatically after receiving the signals coming from the induction system 1, and the analog switch 21 is able to complete connection in order and send out the relatively connected signals to the bus terminals 22, which will synchronously send out the relatively connected signals and finish orderly dialing manually the keys of a mobile telephone to attain a purpose of dialing automatically, thus able to automatically dial a preset telephone number to notify a related person.

Figure 4:
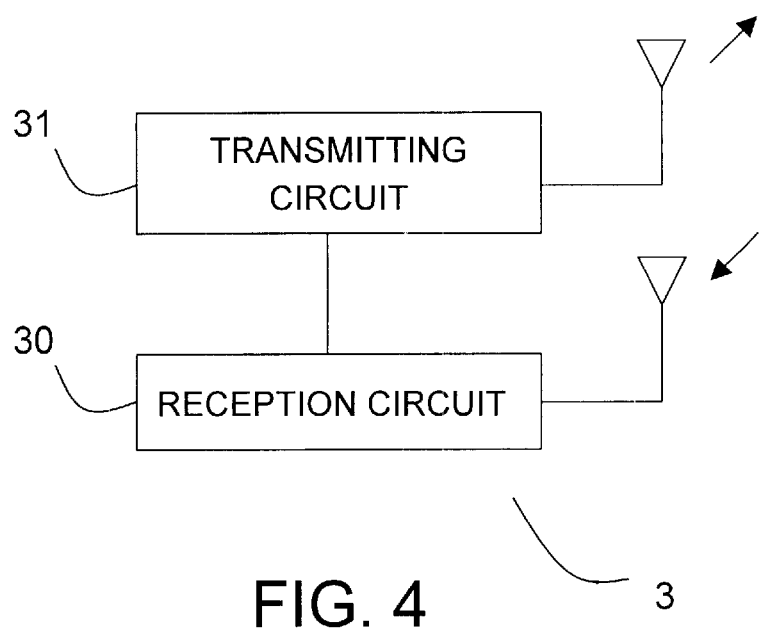
FIG. 4 is a block diagram of a mobile telephone transmitting-receiving system in the present invention.

The mobile telephone transmitting-and-receiving system 3, as shown in FIG. 4, is provided with a reception circuit 30 and a transmission circuit 31 connected with each other. The reception circuit 30 has a reception terminal for receiving signals, while the transmission circuit 31 has a transmission terminal for transmitting signals.

Figure 5:
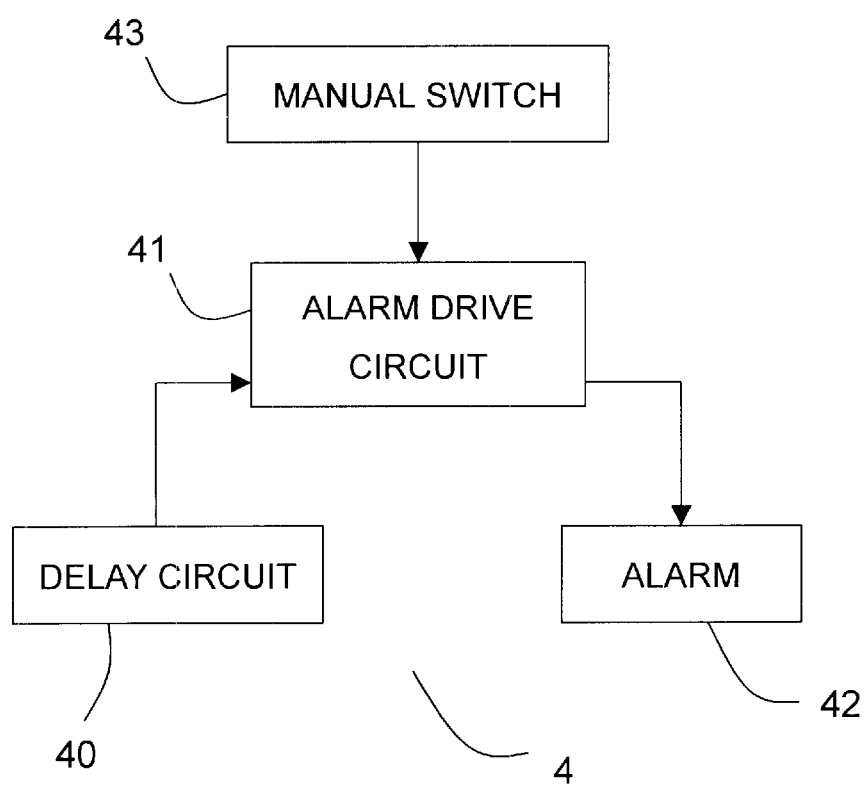
FIG. 5 is a block diagram of an alarm system in the present invention.

The alarm system 4, as shown in FIG. 5, consists of a delay circuit 40, an alarm drive circuit 41, an alarm 42 and a manual switch 43 connected together. The operation of the alarm system is divided into automatically switching and manually switching. By automatically switching, the alarm system 4 starts and, after a delay of a period of time by the delay circuit 40, sends out signals to actuate the alarm drive circuit 41 to start the alarm 42. By manually switching, the alarm system starts and the manual switch 43 is started manually to send out signals to actuate the alarm drive circuit 41 to start the alarm 42, thus able to light up a warning light and give out sound at the same time to frighten a burglar.

Figure 6:
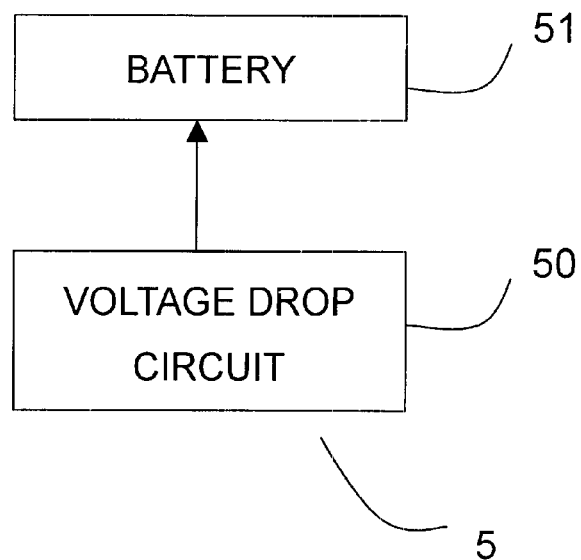
FIG. 6 is a block diagram of an automatic charge system in the present invention.

The automatic charge system 5, as shown in FIG. 6, is composed of a voltage drop circuit 50 and a battery 51 connected with each other The voltage drop circuit 50, after supplied with AC or DC power, will carry out voltage drop and charge the battery 51 of 12 volts to maintain adequate electric power, able to make up a self-supplying power through voltage drop and electricity storage.

Figure 7:
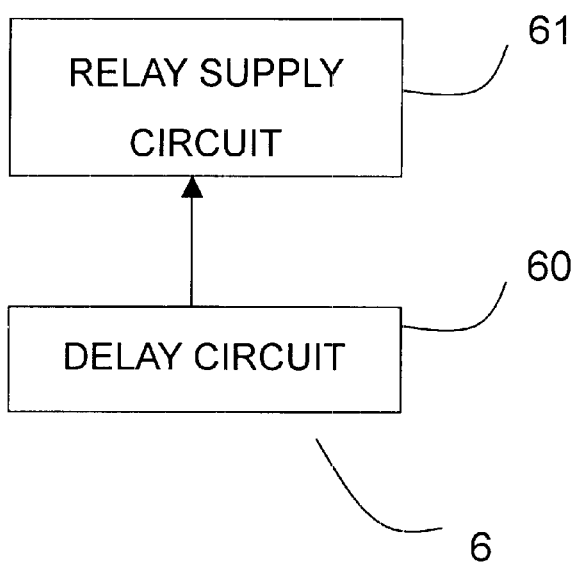
FIG. 7 is a block diagram of a power delay connection system in the present invention; and, FIG. 8 is a flow chart of the operation of the movable anti-theft device for mobile telephones in the present invention.

The power delay connection system 6, as shown in FIG. 7, is provided with a delay circuit 60 and a relay supply circuit 61 connected with each other. The delay circuit 60 is manually started and, after delaying for a period of time, sends out signals to the relay supply circuit 61 to finish supply of power, able to supply all the above-mentioned systems with power after a delay of a period of time.

Figure 8:
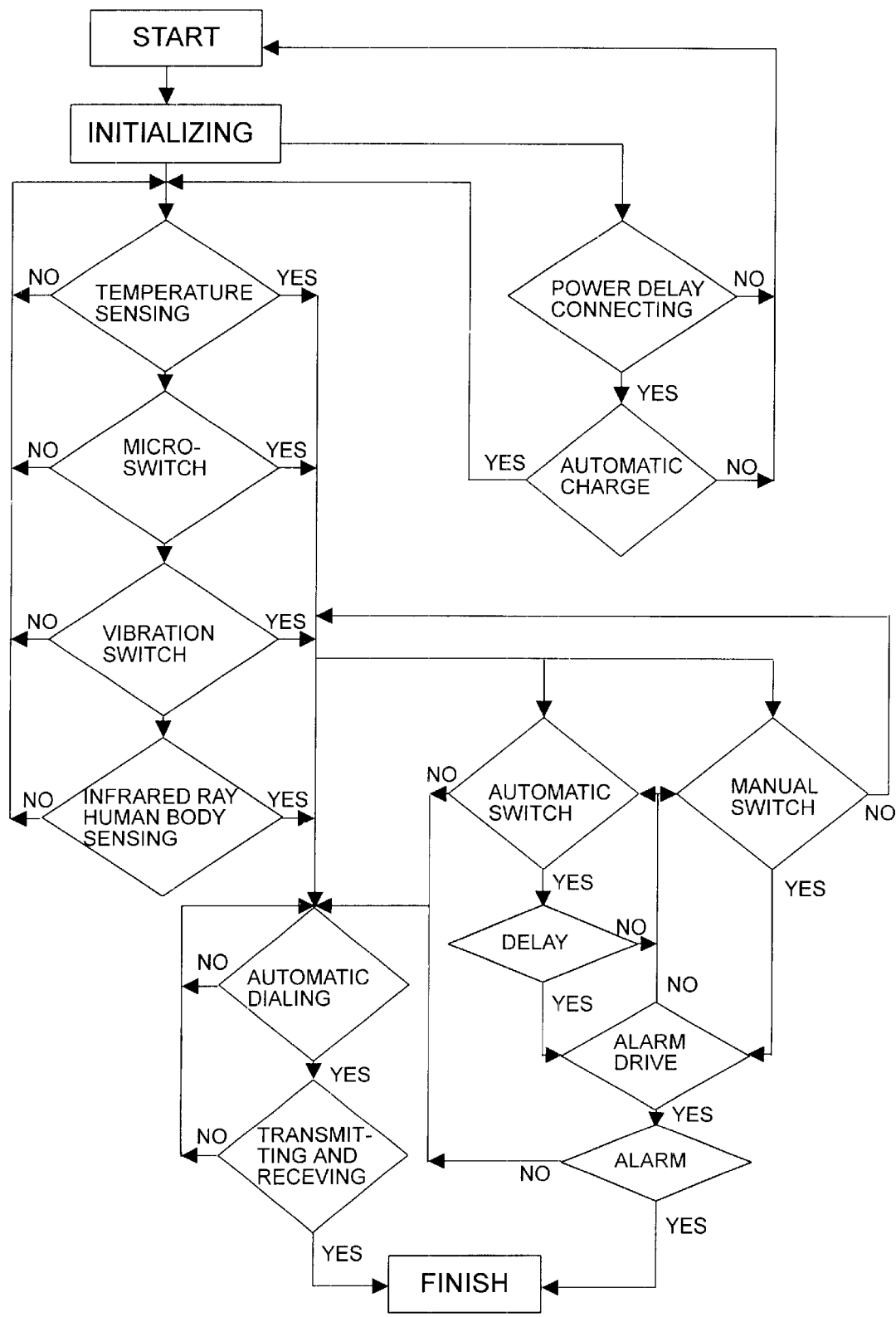

In operating, as shown in FIG. 8, in a normally starting condition, the movable anti-theft device in this invention is able to sense whether or not there is any unusual message. If the temperature sensor 11 is applied, it will sense whether the temperature around is normal or not. If the micro-switch 12 is employed as a sensor, it will sense whether or not there is micro-switching. If the mercury switch 13 is used as a sensor, it will sense whether or not there is vibration switching. If the infrared ray human body sensor 14 is used, it will sense whether or not there is infrared ray human body induction.

In case the sensor does not sense any unusual signal, it will still maintain a normally inductive condition. If the sensor has sensed any unusual signal, the sensor will send out this unusual signal to actuate the automatic dial system 2 to dial automatically the telephone number preset in the mobile telephone transmitting-and-receiving system 3 to notify a related person, so that he/she can immediately get to the site to cope with the situation. If there is no automatically dialing or transmitting and-receiving signals, the automatic dial system 2 and the mobile telephone transmitting-and-receiving system 3 will still maintain a normal condition of automatically dialing or transmitting-receiving signals. At the same time, the automatic switch starts and, after delaying for a period of time, sends out signals to trigger the alarm system 4 to start the alarm 42. In case the automatic switch does not start, and the delay circuit 60 and the alarm system 4 are not actuated to operate, there still maintains a normal condition of automatically switching, time delay and alarm driving. The manual switch 43 is manually started to send out signals to actuate the alarm 42, but if the manual switch 43 is not manually started and the alarm is not actuated to function, there still maintains a normal condition of manually switching and alarm actuating.

Besides, when the movable anti-theft device in this invention is in a normally starting condition, it will check whether or not there is power delay connection, in case of yes, it will supply all the foresaid systems with power after a delay of a period of time, and the automatic charge system 5 is able to make up self-supplying power through voltage drop and electricity storage. Therefore, this invention can maintain a normal starting condition in the event of no power delay connection and automatically charging.

As can be noted from the above description, this invention has the following advantages.

1. Having a function of anti-theft: It can be placed at any place needed to guard against stealing, such as a vehicle, a safe, a valuable article, a company, a store, a warehouse, a secret site, a home and so on. In case an unusual signal should happen, the induction system 1 would sense this unusual signal and send it to the automatic dial system 2 and the alarm system 4, and synchronously the automatic dial system 2 will automatically dial a preset telephone number by means of the mobile telephone to a related person, such as an owner, a security worker, a neighbor, a friend and so forth, so that the person can hurry to the site quickly to cope with the situation, and simultaneously, the alarm 42 will function to light up a warning light and give out warning sound to frighten a burglar.

2. Having function of ensuring security: When an owner is out and there is an outsider breaking into or a stranger approaching the house, it will immediately give out a signal and automatically dial the preset telephone number to notify the owner, and meanwhile give out warning light and warning sound to frighten the burglar.

3. Having function of fire prevention: It is provided with a temperature sensor 14 having the peripheral temperature set at 50° C.–60° C. If the temperature around surpasses this preset range, the temperature sensor 14 will give out a signal to the automatic dial system 2 and the alarm system 4 to dial automatically the preset telephone number by means of the mobile telephone to notify the owner and start the alarm to give out warning light and warning sound at the same time so as to lessen damage caused by a fire.

4. Having function of asking for help: It is provided with an infrared ray human body sensor 11, therefore in case an emergency should happen or a child, an aged person and or a physically disabled person need help urgently, the person only needs to approach the infra-red ray human body sensor 11 to be sensed, and it will give out a signal to actuate the automatic dial system 2 to immediately dial the preset telephone number by the mobile telephone to notify the owner about the situation at home, needless to dial the telephone number himself/herself, and in the meantime, the alarm 42 starts to light up a warning light and give up warning sound, attaining effect of asking for help with quickness.

In addition, all the systems in this invention can be installed in a mobile telephone, in a wired telephone, or in a long-distance wireless telephone for transmitting and receiving signals without distance restriction and channel interference, simple and convenient in use and having effect of practicability and safety.

While the preferred embodiment of the invention has been described above, it will be recognized and understood that various modifications may be made therein and the appended claims are intended to cover all such modifications that may fall within the spirit and scope of the invention.

What is claimed is:

1. A movable anti-theft device for mobile telephones comprising:

an induction system provided on an expansion plate, said induction system consisting of a temperature sensor, a micro-switch, a mercury switch and an infra-red ray human body sensor, said expansion plate having a portion reserved for additionally installing other sensors thereon;

an automatic dial system composed of a shift circuit, an analog switch and bus terminals connected with one another, said shift circuit able to automatically start said analog switch in sequence after receiving signals coming from said induction system, said analog switch orderly completing connection and sending relatively connected signals to said bus terminals, the wires of said bus terminals sending out said relatively connected signals, dialing manually the keys of said mobile telephone orderly completing a purpose of dialing automatically;

a mobile telephone transmitting-and-receiving system provided with a reception circuit and a transmission circuit connected with each other, said reception circuit having a reception terminal for receiving signals, said transmission circuit having a transmission terminal for transmitting signals;

an alarm system provided with a delay circuit, an alarm drive circuit, an alarm and a manual switch connected together, the operation of said alarm system divided into automatically switching and manually switching, said alarm system starting and sending out signals after a delay of a period of time by said delay circuit by automatically switching, said signals actuating said alarm drive circuit to start said alarm, said manual switch started manually to send out signals after said alarm system starts by manually switching, said signals actuating said alarm drive circuit to start said alarm;

an automatically charge system consisting of a voltage drop circuit and a battery connected with each other, said voltage drop circuit carrying out voltage drop and charging said battery after supplied with AC or DC power, permitting said battery to maintain adequate electric power;

a power delay connection system composed of a delay circuit and a relay supply circuit connected with each other, said delay circuit started manually to send out signals to said relay supply circuit to complete power supply after delaying for a period of time; and, said induction system able to sense unusual signals and send them to said automatic dial system and said alarm system, said automatic dial system able to automatically dial a preset telephone number to notify a related person, said mobile telephone transmitting-receiving system able to transmit or receive signals, said alarm system able to light up a warning light and give out sound at the same time to frighten a burglar, said automatic charge system able to make up a self-supplying power through voltage drop and electricity storage, said power delay connection system able to covey power to all the above-mentioned systems after delaying for a period of time, said movable anti-theft device able to transmit or receive signals without distance restriction and channel interference.

2. The movable anti-theft device for mobile telephones as claimed in claim 1, wherein all said systems can be installed in a mobile telephone, in a wired telephone or in a long-distance wireless telephone.

* * * * *